(12) United States Patent
Swei et al.

(10) Patent No.: US 8,765,852 B1
(45) Date of Patent: Jul. 1, 2014

(54) PRE-TREATMENT COATING

(71) Applicant: Hewlett-Packard Development Company, L.P., Fort Collins, CO (US)

(72) Inventors: Jason Swei, San Diego, CA (US); Xi Zeng, San Diego, CA (US); Haigang Chen, San Diego, CA (US); Bor-Jiunn Niu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/755,167

(22) Filed: Jan. 31, 2013

(51) Int. Cl.
*C08L 91/06* (2006.01)

(52) U.S. Cl.
USPC .............. 524/277; 524/503; 524/515

(58) Field of Classification Search
USPC ........... 524/62, 275, 500, 501, 502, 503, 515; 525/50, 55, 56, 57
See application file for complete search history.

(56) References Cited

U.S. PATENT DOCUMENTS

| | | | |
|---|---|---|---|
| 6,906,019 | B2 | 6/2005 | Nitzan et al. |
| 2010/0013875 | A1 | 1/2010 | Diederen et al. |
| 2010/0295891 | A1 | 11/2010 | Goto et al. |
| 2011/0148980 | A1 | 6/2011 | Arai et al. |
| 2011/0303113 | A1 | 12/2011 | Sarkisian et al. |
| 2012/0169808 | A1 | 7/2012 | Kiyomoto et al. |

FOREIGN PATENT DOCUMENTS

JP         2004276253         10/2004

*Primary Examiner* — Vu A Nguyen

(57) ABSTRACT

The present disclosure provides pre-treatment compositions and related methods. As such, a pre-treatment coating for a print medium can include a an evaporable solvent, a matrix, and a wax. The matrix can include from 5 wt % to 20 wt % of a fixer, from 5 wt % to 20 wt % of a low Tg latex, and from 30 wt % to 80 wt % of a high Tg latex. The wax can include from 5 wt % to 30 wt % of a wax. The weight percentages of the matrix and the wax are based on a total amount present in the pre-treatment coating after removal of solvent.

8 Claims, 1 Drawing Sheet

PRE-TREATMENT COATING

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection or piezoelectric pressure or oscillation onto the surface of a media.

Pre-treatment compositions or coatings can likewise be applied to various media to improve printing characteristics and attributes of an image. Such composition can be substantially colorless and can be formulated to interact with the colorant and/or with polymeric components of certain ink compositions. With the use of such pre-treatment compositions, precipitated colorants deposited on the surface of recording media can provide enhancement of image quality. For example, improved optical density and high speed printing may be achieved with such pre-treatment compositions. However, many pre-treatment formulations that are acceptable in one area are not as acceptable in others, and thus, research and development related to pre-treatment formulations that can produce higher quality print images on the print media surfaces continue to be sought.

BRIEF DESCRIPTION OF THE DRAWINGS

Additional features and advantages of the disclosure will be apparent from the detailed description which follows, taken in conjunction with the accompanying drawings, which together illustrate, by way of example, features of the invention; and, wherein.

Figure 1:
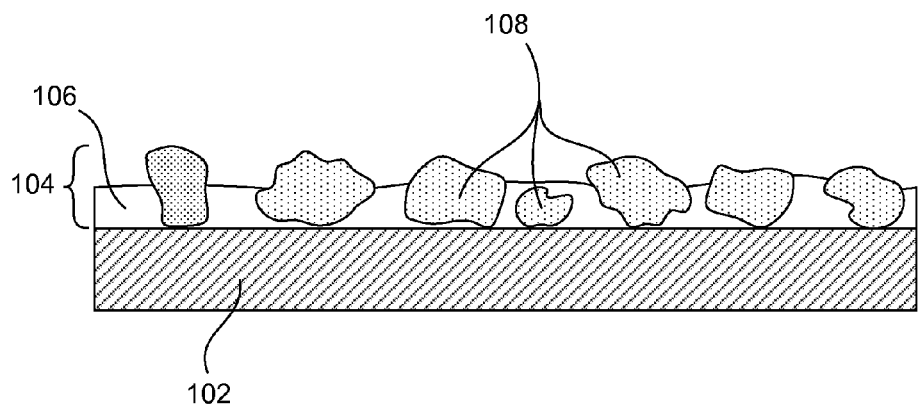
FIG. 1 provides a cross-sectional view of a pre-treatment coating on a print medium in accordance with an example of the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

It has been recognized that traditional pre-treatment coatings that can provide high quality print images lack durability when used in packaging applications or similar applications that subject the printed images to a high degree of surface contact. As such, it has been discovered that the use of wax particles in pre-treatment coatings can provide excellent durability, thereby preserving the quality of the printed image even with more significant surface to surface contact. Specifically, the pre-treatment coatings of the present disclosure can include wax particles having a particle size that is greater than the thickness of a matrix that is also used in the pre-treatment coating. Further, the present pre-treatment coatings can provide exceptional results when used in conjunction with uncoated media.

It is noted that when discussing the present compositions and methods, each of these discussions can be considered applicable to each of these examples, whether or not they are explicitly discussed in the context of that example. Thus, for example, in discussing a wax in a pre-treatment coating, such a wax can also be used in a method of providing a durable coating to a print medium, and vice versa.

The pre-treatment coatings described herein can be useful for a number of different media types. However, it is particularly beneficial when using aqueous-based inkjet printers to print on coated and low porisity commercial print media, including low porosity coated and uncoated print media. An example of such uncoated media is super calendered media that has been compressed to an extent that the surface has a high gloss. This type of media is often used for applications such as magazines or packaging applications, and are typically printed on using analog methods such as an offset or lithographic printing press. This type of media also tends to be very low cost and available in mass quantities. However, printing on them with aqueous inkjet inks can be very challenging. Unlike offset lithography inks, inkjet inks don't adhere very well to this type of print media and thus any resultant images lack durability. The use of a pre-treatment coating of the present disclosure overcomes this durability issue while providing a high image quality that is valuable for printing applications, such as the aforementioned packaging.

In accordance with this, a pre-treatment coating for a print medium can include an evaporable solvent, a matrix, and a wax. The evaporable solvent can be water or other solvent or solvent system that is readily removable by drying, evaporation, heating, etc. The matrix can include from 5 wt % to 20 wt % of a fixer, from 5 wt % to 20 wt % of a low Tg latex, and from 30 wt % to 80 wt % of a high Tg latex. The wax can be present at from 5 wt % to 30 wt % as well. The weight percentages of the matrix and the wax are based on a total amount present in the pre-treatment coating after removal of solvent used to carry the pre-treatment coating to the media surface. Thus, it is a solids weight percentage.

In another example, a printable medium can comprise a media substrate and a pre-treatment coating coated on the media substrate. The pre-treatment coating can comprise a matrix and wax particles. The matrix can include from 5 wt % to 20 wt % of a fixer, from 5 wt % to 20 wt % of a low Tg latex, and from 30 wt % to 80 wt % of a high Tg latex. The wax particles can be present at from 5 wt % to 30 wt %, and can have an average particle size from 0.5 μm to 50 μm. At least a portion of the wax particles can have a particle size that is greater than a thickness of the matrix applied to the media substrate. Again, the weight percentages are by solids after any carrier or evaporable solvent has been removed.

In each of these examples, the fixer provides high image quality by preventing color bleed and other visual artifacts when an aqueous ink is printed thereon. It also increases image quality by keeping the image close to the surface of the pre-treatment coating. The low Tg latex material improves durability by binding the ingredients of the matrix to each other and to the underlying media. The high Tg latex remains in a particle form allowing ink components to penetrate the matrix, providing a desirable surface morphology for receiving aqueous inkjet ink. Furthermore, the wax enhances scratch and rub resistance by physically keeping surfaces away from other potential damaging surfaces.

Generally, the matrix includes all of the solid component of the pre-treatment coating except for the wax. The wax includes wax particles that extend in size beyond a thickness of the matrix when applied to the media substrate. This structural arrangement allows the wax particles to protect the underlying matrix when the pre-treatment coating contacts other substrates, objects, etc. The resulting effect is excellent durability of the pre-treatment coating and printed images that may be printed thereon. Such durability provides retention of the print quality of the printed image, which can be measured by gloss, optical density, color bleed, scratch resistance, coalescence, water smudge, etc.

Turning to FIG. 1, a coated medium 100 can include a print medium 102 coated with a pre-treatment coating 104. The pre-treatment coating can include a matrix 106 embedded with wax particles 108. The wax particles generally extend above the surface of the matrix, though it is not required that all of the wax particles be larger in size than the thickness of the matrix. For example, the size of at least a portion of the wax particles can be greater than the thickness of the matrix. That being stated, it is not required that all of the wax particles be larger in size than the thickness of the matrix. However, the size of at least a portion of the wax particles can be greater than the thickness of the matrix. In one example, at least 50% of the wax particles can have a particle size greater than the thickness of the matrix. In one aspect, at least 75% of the wax particles can have a particle size greater than the thickness of the matrix. In one specific aspect, at least 90% of the wax particles can have a particle size greater than the thickness of the matrix. In one example, the matrix can have a thickness of 100 nm to 100 µm and the wax can have an average particle size of 100 nm to 100 µm. Though these ranges overlap, it is understood that a portion of the wax particles will be larger is size than the thickness of the matrix coated on the media substrate.

In further detail regarding the wax particle size, these wax particles can have an average particle size of 1 µm to 50 µm. In another example, the wax particles can have an average particle size of 5 µm to 50 µm. In still another example, the wax particles can have an average particle size of 5 µm to 12 µm. In one aspect, the wax particles can have an average particle size of 12 µm to 20 µm. In one specific aspect, the wax particles can have an average particle size of about 8 µm. In another aspect, the wax particles can have an average particle size of about 15 µm to 18 µm. As used herein, "average particle size" refers to the average cross-section of the particle, e.g. wax particle, when such particle is non-spherical. When particles are non-spherical, the largest diameter sphere that can be fitted within the particle can be considered D1. The smallest diameter sphere that can completely contain the particle can be considered D2. In one example, the "average particle size" can be measured as the average of D1 and D2, which is referred to simply as D.

Additionally, the wax particles can be spread throughout the coating such that the particles have an average spacing S that is at least twice the diameter D of the particles. In one example, the average spacing S is at least 3 times D. In another example, the average spacing S is at least 4 times D.

Additionally the wax particles can be distributed so as to have an area density coverage that is within a specific range. The area density coverage is the percentage of the area of the media covered by the particles. According to this metric, each particle covers a portion of the media that is defined by a cylindrical projection of the particle that is normal to the media. Thus, the area covered would be defined by a circle having the same diameter (D) as the particle. In one example, the area density coverage would be in the range of 0.5% to 20% of the area of the media. In yet a more specific aspect, the area density coverage would be 1% to 10% of the area of the media. Some specific examples of area density coverage would be about 1%, about 4%, about 5% coverage. In general an area coverage density that is above about 20% coverage may begin to adversely impact print quality. An area coverage density below about 0.5% may be insufficient to provide scratch and/or rub resistance of an image printed upon the media.

Generally, the wax particles can be chosen such that the ratio of the wax particle size to the thickness of the pre-treatment coating plus any printed ink thereon is greater than 1. Such a ratio provides that the wax particles extend above the surface of any printing on the pre-treatment coating, thereby protecting the underlying printed image. In one example, the ratio can range from 10:1 to 1.01:1, and in one aspect, can range from 3:1 to 1.01. In another specific aspect, the ratio can range from 2:1 to 1.01:1, or even 1.1:1 to 1.01:1.

The wax can be selected based on various printing factors such as compatibility, particle size, melting point, etc. Typically, waxes are available as wax emulsions. Wax emulsions are commercially available from a number of vendors, for example Keim-Additec, Lubrizol, Michelman, and BYK Chemie. Wax emulsions useful for the present compositions can include but are not limited to: Lubrizol: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N; Byk: Aquacer® 2650, Aquacer® 507, Aquacer® 533, Aquacer® 515, Aquacer® 537, Aquaslip™ 671, Aquaslip™ 942, combinations thereof, and the like.

Wax suspended in water includes, but is not limited to, particles of a synthetic wax, a natural wax, a combination of a synthetic wax and a natural wax, a combination of two or more different synthetic waxes, or a combination of two or more different natural waxes, for example. In some examples, the synthetic wax includes, but is not limited to, polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, polyamide, or polyester resin. In some examples, the natural wax includes, but is not limited to, carnauba wax, paraffin wax, montan wax, candelilla wax, ouricury wax, sufarcane wax, retamo wax, or beeswax. In one example, the wax can be a polyethylene wax.

In one example, the wax can have a melting point ranging from 60° C. to 110° C. Generally, the wax can be present in the pre-treatment coating at a concentration ranging from 5 wt % to 30 wt %, or from 5 wt % to 20 wt %. In another example, the wax can be present ranging from 10 wt % to 20 wt %, and in one aspect, 11 wt % to 17 wt %. Additionally, the wax emulsions can include compatible binders and dispersants. By compatible, the present waxes can be used without causing aggregation or precipitation of dispersants/binders, particularly over extended periods of time (weeks/months at ambient temperature or days/weeks at elevated temperature such as 40° to 65° C.). Incompatibility can manifest itself by increases in wax particle size, phase separation of wax, or creaming at a faster rate than in the absence of destabilizing materials.

As discussed herein, the matrix generally includes the remaining (non-wax) compounds of the pre-treatment composition. The matrix typically includes a fixer and multiple latexes, and can also include binder, surfactant, and/or defoamer, in some examples. In one example, the fixer can be a polyvalent metal salt. The polyvalent metal salt can be a divalent or a higher polyvalent metallic ion and anion. In one example, the polyvalent metal salt components can be soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; and trivalent metallic ions, such as $Al^{3+}$, $Fe^{3+}$ and $Cr^{3+}$. In one example, the polyvalent metallic ion can be $Ca^{2+}$, $Mg^{2+}$ or $Zn^{2+}$. In one aspect, the polyvalent metallic ions can be $Ca^{2+}$. Examples of anions include $Cl^-$, $I^-$, $Br^-$, $NO_3^-$ or $RCOO^-$ (where R is H or any hydrocarbon chain). In one example, the polyvalent metal salt anion can be a chloride ($Cl^-$) or acetate ($CH_3COO^-$). In other examples, the polyvalent metal salt can include divalent or other polyvalent metallic ions and nitrate or carboxylate ions. The carboxylate ions can be derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid.

In one example, the fixer can be a polyvalent metal salt including calcium chloride, calcium nitrate, magnesium nitrate, magnesium acetate, and/or zinc acetate. In one aspect, the polyvalent metal salt can be calcium chloride or calcium nitrate ($CaCl_2$ or $Ca(NO_3)_2$). In one additional specific aspect, the polyvalent metal salt can be calcium chloride ($CaCl_2$).

Generally, the fixer can be present in the pre-treatment coating at a concentration ranging from 5 wt % to 20 wt %, based on the solids content after the solvent has been removed. In another example, the fixer can be present in an amount ranging from 5 wt % to 15 wt %, and in one aspect, 10 wt % to 20 wt %. It is understood that these ranges are not intended to be limiting and that the amounts can be adjusted for the desired application.

In addition to the above, the matrix can include a low Tg latex and a high Tg latex. The combination of latexes can provide increased durability. As used herein, "latex" can be used interchangeable with "latex particle" and refer to polymeric masses that are dispersed in a fluid. However, it is understood that when the pre-treatment coating is dried, the liquid or solvents is generally driven off and the latex particles are what remain with the print media as part of the pre-treatment coating.

In one example, the latex particle can be made of polymers and copolymers including acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In another example, the latex particle can include a vinyl acetate-based polymer, an acrylic polymer, a styrene polymer, a styrene-butadiene (SBR)-based polymer, a polyester-based polymer, a vinyl chloride-based polymer, an acid-based polymer, or the like. In one aspect, the latex particle can be a polymer or a copolymer including acrylic polymers, vinyl-acrylic copolymers and acrylic-polyurethane copolymers. In another aspect, the latex particle can be cationic acrylate latex. In one specific aspect, the latex can be a vinyl acetate polymer.

Generally, the latex particles can have a weight average molecular weight (Mw) of 5,000 to 500,000. In one example, the latex particles can range from 150,000 Mw to 300,000 Mw. In some examples, the average particle diameter of the latex particles can be from 10 nm to 1 μm and, as other examples, from 10 to 500 nm, and in yet other examples, from 50 nm to 250 nm. The particle size distribution of the latex is not particularly limited, and either latex having a broad particle size distribution or latex having a mono-dispersed particle size distribution may be used. It is also possible to use two or more kinds of polymer fine particles each having a mono-dispersed particle size distribution in combination.

The glass transition temperature (Tg) of the high Tg latex can be at least 80° C., and in one aspect, can be from 80° C. to 140° C. In one example, the Tg of the high Tg latex can range from 80° C. to 120° C., and in one aspect, can range from 100° C. to 115° C. Generally, the Tg of the low Tg latex can be below the Tg of the high Tg latex. In one example, the Tg of the low Tg latex can be less than about 80° C., e.g., from −25° C. to 80° C. In one aspect, the Tg of the low Tg latex can range from −25° C. to 50° C., and in one specific aspect, can range from −25° C. to 0° C.

The low Tg latex can be present, by solids content, in the pre-treatment composition (after removal of the solvent) at from 5 wt % to 20 wt %, from 5 wt % to 15 wt %, or from 10 wt % to 20 wt %. The high Tg latex can be present, by solids content, in the pre-treatment composition (after removal of the solvent) at from 30 wt % to 80 wt %, from 30 wt % to 50 wt %, or from 50 wt % to 80 wt %.

As mentioned, the matrix can also include a binder. Examples of suitable binders that can be used include polyvinyl alcohols (including water-soluble PVA copolymers such as copolymers of PVA and poly(ethylene oxide) or copolymers of PVA and polyvinylamine, cationic PVAs, acetoacetylated PVAs, and silyl-modified PVA); polyvinyl acetates; polyvinyl pyrrolidones (including copolymers of polyvinyl pyrrolidone and polyvinyl acetate); starch; modified starch (including oxidized and etherified starches); water soluble cellulose derivatives (including carboxymethyl cellulose and hydroxyethyl cellulose); polyacrylamides (including polyacrylamide derivatives and copolymers); casein; gelatin; soybean protein; conjugated diene copolymers (including maleic anhydride resin and styrene-butadiene copolymer); acrylic polymers (including polymers and copolymers of acrylic and methacrylic acids); vinyl polymers (including ethylene-vinyl acetate copolymers); functional group-modified polymers (including those obtained by modifying the above-mentioned polymers with monomers containing functional groups such as carboxyl, amino, amido, and sulfo groups); cationic polymers, including cationic polyamides; aqueous binders of thermosetting resins (including melamine resins and urea resin); and synthetic resin binders (including polymethyl methacrylate, polyurethane resin, polyester resin, amide resin, vinyl chloride-vinyl acetate copolymer, polyvinyl butyral, and alkyl resins). In one example, the binder can be starch or modified starch.

The binder, if present, can be included in the pre-treatment coating at a concentration ranging from 5 wt % to 20 wt %, based on the solids content of the pre-treatment coating after solvent has been removed. In one example, the binder can be present in an amount ranging from 5 wt % to 15 wt %, and in one aspect, 10 wt % to 15 wt %. It is understood that these ranges are not intended to be limiting and that the amounts can be adjusted for the desired application.

Further, the matrix can contain surfactants. Non-limiting examples of suitable surfactants include nonionic surfactant, cationic surfactant, and combinations thereof. In one example, the surfactant can be a nonionic surfactant. In one aspect, the surfactant can be a nonionic surfactant including nonionic fluorosurfactant, nonionic acetylenic diol surfactant, nonionic ethoxylated alcohol surfactant, and combinations thereof.

Several commercially available nonionic surfactants that can be used in the formulation of the pre-treatment composition include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; fluorinated Poly-Fox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, or combinations thereof.

The surfactant, if present, can be included in the pre-treatment composition at from about 0.05 wt % to about 1.5 wt %. In one example, the surfactant can be present in an amount ranging from about 0.1 wt % to about 1 wt %. In one aspect, the surfactant can be present in an amount ranging from about 0.2 wt % to about 0.6 wt %.

Other additives can be added to the pre-treatment matrix including cross-linkers, defoamers, plasticizers, fillers, stabilizers, dispsersants, biocides, optical brighteners, viscosity modifiers, leveling agents, UV absorbers, anti-ozonants, etc. Such additives can be present in the pre-treatment compositions in amounts from 0.01 wt % to 20 wt %. Generally, the cross-linker can cross-link the binder.

Figure 2:
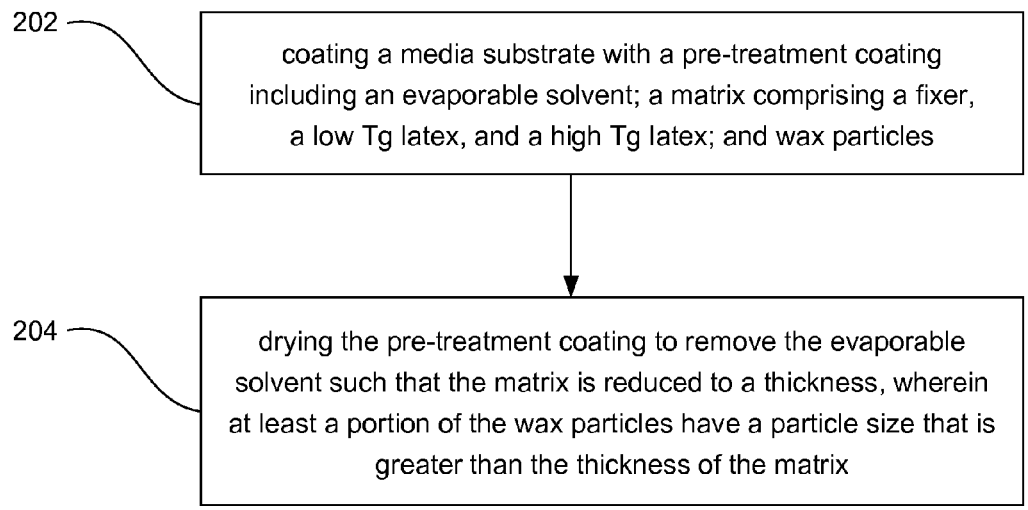
FIG. 2 depicts a flow chart of a method in accordance with an example of the present disclosure.

Referring to FIG. 2, a method 200 of providing a durable coating to a print medium can include coating 202 a substrate with a pre-treatment coating including a matrix and wax particles. The matrix can include a fixer, a low Tg latex, and a high Tg latex. An additional step includes drying 204 the pre-treatment coating to remove solvent such that the matrix is reduced to a thickness, wherein at least a portion of the wax particles have a particle size that is greater than the thickness of the matrix.

General coating methods that can be used include slot-die coating, rod coating such as Mayer rod coating, blade coating, gravure coating, knife-over-roll coating, cascade coating, curtain coating, and the like. Generally the pre-treatment coatings can be applied at a basis weight of 0.1 gsm to 10 gsm. In one example, the basis weight can be from 1 gsm to 5 gsm, and in one aspect, from 2 gsm to 3 gsm.

Generally, during manufacture and subsequent application to a print medium, the present pre-treatment coatings initially include water or other solvent system, allowing for processability, which can be removed via drying or over time.

The pre-treatment coatings of the present disclosure can be suitable for use on many types of substrates of print media, including but not limited to, paper media, nonporous media, swellable media, microporous media, photobase media, offset media, coated media, uncoated media, and other types of media including plastics, vinyl media, fabrics, woven substrate, etc. In one example, the substrate can be a swellable media, a microporous media, or an offset media.

The present pre-treatment coatings are generally used in conjunction with an inkjet ink. Such inkjet inks generally include a colorant dispersed or dissolved in an ink vehicle. As used herein, "liquid vehicle" or "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance of the formulation can be purified water, and the inkjet ink can optionally include a latex.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate the pre-treatment compositions and methods that are presently known. However, it is to be understood that the following are only exemplary or illustrative of the application of the principles of the present compositions and methods. Numerous modifications and alternative pre-treatment compositions and methods may be devised by those skilled in the art without departing from the spirit and scope of the present compositions and methods. The appended claims are intended to cover such modifications and arrangements. Thus, while the present pre-treatment compositions and methods have been described above with particularity, the following examples provide further detail in connection with what are presently deemed to be acceptable embodiments.

Example 1

Pre-Treatment Coatings

Pre-treatment coatings were prepared by admixing the ingredients according to Tables 1A, 1B, and 1C in water (solvent). The Pre-treatment coatings were applied to the print media via a rod coating process at a basis weight of 3 gsm. After coating, the media was dried to remove any solvents, providing the weight percentages listed in Tables 1A, 1B, and 1C.

TABLE 1A

| Ingredients | Pretreat Coating #1 (wt %) | Pretreat Coating #2 (wt %) | Pretreat Coating #3 (wt %) | Pretreat Coating #4 (wt %) | Pretreat Coating #5 (wt %) |
|---|---|---|---|---|---|
| $CaCl_2$ | — | 7.92 | 7.92 | 11.43 | 14.68 |
| PVA (88% hydrolyzed and viscosity of 40 cPs) | 0.43 | 0.40 | — | 0.38 | 0.37 |
| PVA (98% hydrolyzed and viscosity of 4 cPs) | — | — | 0.40 | — | — |
| High Tg Latex (Tg 115° C.) | 73.15 | 67.35 | 67.35 | 64.79 | 62.41 |
| High Tg Latex (Tg 92° C.) | — | — | — | — | — |
| Low Tg Latex (−22° C. Tg) | 12.91 | 11.89 | 11.89 | 11.43 | 11.01 |
| Low Tg Latex (5° C. Tg) | — | — | — | — | — |
| Wax (particle diameter 15-18 μm) | 12.91 | 11.89 | 11.89 | 11.43 | 11.01 |
| Wax (particle diameter 8 μm) | — | — | — | — | — |
| Surfactant | 0.43 | 0.40 | 0.40 | 0.38 | 0.37 |
| Defoamer | 0.17 | 0.16 | 0.16 | 0.15 | 0.15 |

TABLE 1B

| Ingredients | Pretreat Coating #6 (wt %) | Pretreat Coating #7 (wt %) | Pretreat Coating #8 (wt %) | Pretreat Coating #9 (wt %) | Pretreat Coating #10 (wt %) |
|---|---|---|---|---|---|
| $CaCl_2$ | 12.91 | 12.38 | 11.89 | 11.01 | 12.91 |
| PVA (88% hydrolyzed and viscosity of 40 cPs) | 0.43 | 0.41 | 0.40 | 0.37 | 0.43 |
| PVA (98% hydrolyzed and viscosity of 4 cPs) | — | — | — | — | — |
| High Tg Latex (Tg 115° C.) | 73.15 | 70.13 | 67.35 | 62.41 | 73.15 |
| High Tg Latex (Tg 92° C.) | — | — | — | — | — |
| Low Tg Latex (−22° C. Tg) | 12.91 | 12.38 | 11.89 | 11.01 | — |
| Low Tg Latex (5° C. Tg) | — | — | — | — | 12.91 |
| Wax (particle diameter 15-18 μm) | — | 4.13 | 7.92 | 14.68 | — |
| Wax (particle diameter 8 μm) | — | — | — | — | — |
| Surfactant | 0.43 | 0.41 | 0.40 | 0.37 | 0.43 |
| Defoamer | 0.17 | 0.17 | 0.16 | 0.15 | 0.17 |

TABLE 1C

| Ingredients | Pretreat Coating #11 (wt %) | Pretreat Coating #12 (wt %) | Pretreat Coating #13 (wt %) |
|---|---|---|---|
| $CaCl_2$ | 11.43 | 11.43 | 11.43 |
| PVA (88% hydrolyzed and viscosity of 40 cPs) | 0.38 | 0.38 | 0.38 |
| PVA (98% hydrolyzed and viscosity of 4 cPs) | — | — | — |
| High Tg Latex (Tg 115° C.) | 64.79 | 64.79 | — |
| High Tg Latex (Tg 92° C.) | — | — | 64.79 |
| Low Tg Latex (−22° C. Tg) | — | 11.43 | 11.43 |
| Low Tg Latex (5° C. Tg) | 11.43 | — | — |
| Wax (particle diameter 15-18 μm) | 11.43 | — | 11.43 |
| Wax (particle diameter 8 μm) | — | 11.43 | — |
| Surfactant | 0.38 | 0.38 | 0.38 |
| Defoamer | 0.15 | 0.15 | 0.15 |

Example 2

Data

The pre-treatment compositions of Example 1 were tested for differing print quality characteristics as listed in Table 2.

TABLE 2

| Pre-treatment Coating # | Image Quality | Dry durability | Wet Durability |
|---|---|---|---|
| 1 | 1 | 5 | 5 |
| 2 | 2 | 5 | 5 |
| 3 | 2 | 5 | 5 |

TABLE 2-continued

| Pre-treatment Coating # | Image Quality | Dry durability | Wet Durability |
|---|---|---|---|
| 4 | 5 | 5 | 5 |
| 5 | 5 | 5 | 5 |
| 6 | 5 | 2 | 3 |
| 7 | 5 | 3 | 4 |
| 8 | 5 | 4 | 5 |
| 9 | 5 | 5 | 5 |
| 10 | 5 | 2 | 3 |
| 11 | 5 | 5 | 5 |
| 12 | 5 | 5 | 5 |
| 13 | 5 | 4 | 4 |

Image Quality was measured by a visual assessment of bleed and coalescence. Good image quality was defined by not having any bleed or coalescence during printing. Dry Durability was measured by a visual assessment of damage to the print area from a Sutherland® Rub tester. The dry durability was tested using a 4 lb weight and 100 cycles of rubbing on the printed area. Wet Durability was measured by a visual assessment of damage to the print area using a Taber® 5750 Linear Abraser and a wet TexWipe®. The wet durability was tested using a wet TexWipe® for 1 cycle of rubbing on the printed area Pre-treatment Coatings 1 to 13 above set forth various combinations of fixer, polymeric binders, and latexes. Pre-treatment Coating #1 showed poor image quality without addition of a fixer. Pre-treatment Coatings #2 and #3 showed poor image quality with about 8 wt % fixer. Pre-treatment Coatings #4 and #5 demonstrated excellent results. Pre-treatment Coating #6 showed poor wet and dry durability without the addition of wax particles. Pre-treatment Coating #7 demonstrated that adding wax particles improved wet durability and dry durability but not to the extent of other formulations, e.g., Pre-treatment Coatings #4 and #5. Pre-treatment Coating #8 demonstrated that adding additional wax continued improvement of both wet and dry durability but not to the extent of other formulations, e.g., Pre-treatment Coatings #4 and #5. Pre-treatment Coating #9 demonstrated excellent results and showed that more wax was required to achieve top results than used in Pre-treatment Coatings #7 and #8. Pre-treatment Coating #10 showed poor wet and dry durability without the addition of wax particles. Pre-treatment Coating #11 demonstrated excellent results. Pre-treatment Coating #12 demonstrated excellent results. Pre-treatment Coating #13 showed the both wet and dry durability was lowered with the change of the high Tg latex.

What is claimed is:

1. A pre-treatment coating for a print medium, comprising:
water;
a matrix including:
from 5 wt % to 20 wt % of a polyvalent salt,
from 5 wt % to 20 wt % of a low Tg latex, and
from 30 wt % to 80 wt % of a high Tg latex; and
a wax at from 5 wt % to 30 wt %;
wherein weight percentages of the matrix and the wax are based on total solids present in the pre-treatment after removal of the water.

2. The pre-treatment coating of claim 1, wherein the polyvalent salt includes one or more metallic ions selected from the group consisting of: $Ca^{2+}$, $Cu^{2+}$, $Ni^{2+}$, $Mg^{2+}$, $Zn^{2+}$, $Ba^{2+}$, $Al^{3+}$, $Fe^{3+}$, and $Cr^{3+}$.

3. The pre-treatment coating of claim 1, wherein the matrix further includes from 0.01 wt % to 5 wt % of a binder, wherein the binder based on a total amount of binder present in the pre-treatment coating after removal of the water, wherein the binder is selected from the group consisting of polyvinyl alcohol, polyvinyl acetates, polyvinyl pyrrolidones, starch, modified starch, water soluble cellulose derivatives, polyacrylamides, casein, gelatin, soybean protein, conjugated diene copolymers, functional group-modified polymers, acrylic polymers, vinyl polymers, cationic polymers, aqueous binders of thermosetting resins, synthetic resin binders, and mixtures thereof.

4. The pre-treatment coating of claim 1, wherein the low Tg latex and the high Tg latex are independently selected from the group consisting of polyacrylates, polyvinyls, polyurethanes, ethylene vinyl acetates, styrene acrylic copolymers, styrene butadienes, polymethacrylates, polyacrylic acids, polymethacrylic acids, and mixtures thereof.

5. The pre-treatment coating of claim 1, wherein the high Tg latex is a cationic acrylate latex or the low Tg latex is an acrylate-urethane latex.

6. The pre-treatment coating of claim 1, wherein the wax is selected from the group consisting of polyethylene, polypropylene, polyamide, polytetrafluoroethylene, carnuba, and mixtures thereof.

7. The pre-treatment coating of claim 1, further comprising a solvent.

8. The pre-treatment coating of claim 1, wherein the matrix further comprises surfactant and defoamer.

* * * * *

UNITED STATES PATENT AND TRADEMARK OFFICE
CERTIFICATE OF CORRECTION

| | | |
|---|---|---|
| PATENT NO. | : 8,765,852 B1 | Page 1 of 1 |
| APPLICATION NO. | : 13/755167 | |
| DATED | : July 1, 2014 | |
| INVENTOR(S) | : Jason Swei et al. | |

It is certified that error appears in the above-identified patent and that said Letters Patent is hereby corrected as shown below:

In the Claims:

In column 12, line 40, in Claim 6, delete "carnuba," and insert -- carnauba, --, therefor.

Signed and Sealed this
Twenty-fifth Day of November, 2014

Michelle K. Lee
*Deputy Director of the United States Patent and Trademark Office*